United States Patent [19]
Barens

[11] Patent Number: 5,467,660
[45] Date of Patent: Nov. 21, 1995

[54] VARIABLE-SPEED GEAR MECHANISM

[76] Inventor: Ivor Barens, 401 Markham Street, Toronto, Ontario, Canada, M6G 2L1

[21] Appl. No.: 252,223
[22] Filed: Jun. 1, 1994
[51] Int. Cl.$^6$ .................................................... F16H 3/24
[52] U.S. Cl. .................................................... 74/351
[58] Field of Search .................. 74/351 OR, 665 F, 74/665 H, 665 S

[56] References Cited

U.S. PATENT DOCUMENTS

| | | |
|---|---|---|
| 684,215 | 10/1901 | Foster . |
| 870,715 | 11/1907 | Cowles ........................................ 74/351 |
| 874,657 | 12/1907 | Burger ........................................ 74/351 |
| 955,279 | 4/1910 | Moore, Sr. ................................ 74/351 |
| 1,438,444 | 12/1922 | Louat ........................................ 74/351 |
| 2,803,145 | 8/1957 | Fisher ........................................ 74/351 |
| 3,075,397 | 1/1963 | Winter . |
| 5,065,638 | 11/1991 | Barens . |

FOREIGN PATENT DOCUMENTS 405622  1/1910  France .

Primary Examiner—Rodney H. Bonck
Assistant Examiner—Peter Kwon
Attorney, Agent, or Firm—Mirek A. Waradsa

[57] ABSTRACT

A variable-speed gear mechanism comprises a pinion with spring-biased radial pins and a face gear with an operative face that meshes with the pinion at various meshing radii. The gear has a central part which defines a radially innermost set of part-cylindrical sockets. Each socket has an axial opening which faces outwardly from the gear face and a lateral opening which faces radially outwardly and through which a pin is received laterally into the socket during meshed operation. A recess extends radially outwardly and in both circumferential direction from the bottom of the lateral opening of each socket, permitting unobstructed movement of a pin to and from the socket. A circular groove may define the required recesses. Its depth at a particular radius may be sufficient to avoid contact between the pins and the face gear thereby providing a neutral function. Meshing structure at a next larger meshing radius may consist of another set of sockets with lateral openings facing radially inwardly. Radial grooves may direct a pin located in a socket of the innermost set to a corresponding socket in the other set as the pinion is moved radially to change gear ratios.

13 Claims, 3 Drawing Sheets

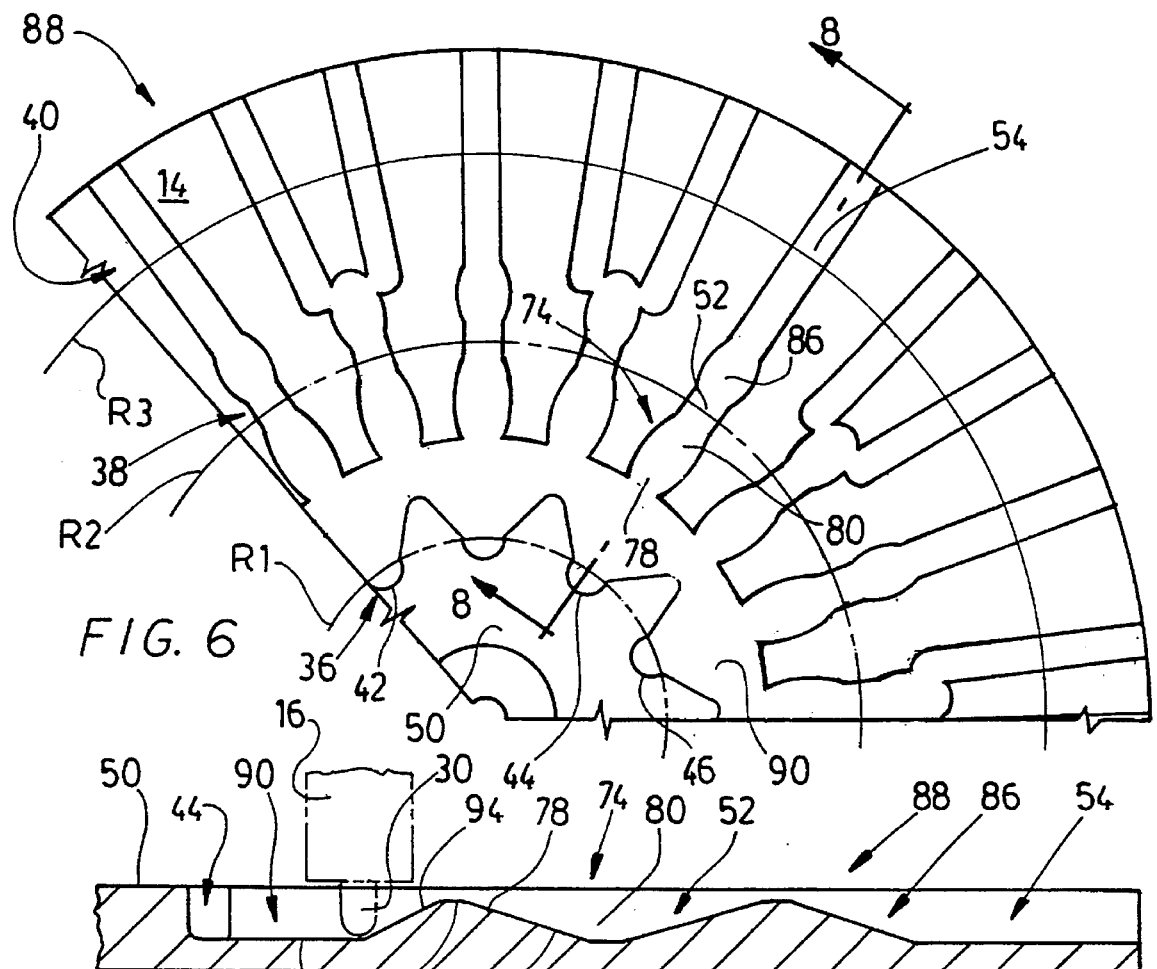
FIG. 6
FIG. 7
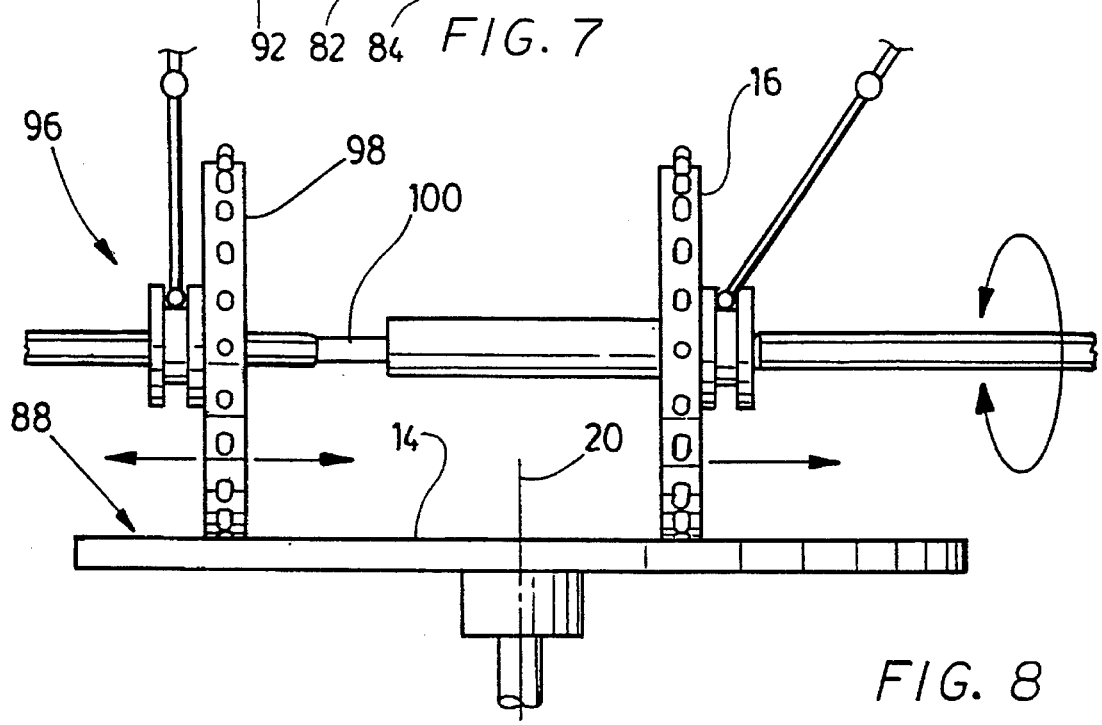
FIG. 8

VARIABLE-SPEED GEAR MECHANISM

FIELD OF THE INVENTION

The invention relates generally to gear mechanisms in which a pinion with radial pins meshes at various predetermined radii with the operative face of a gear, usually a thin disk, that is referred to in this specification as a "face gear."

DESCRIPTION OF THE PRIOR ART

Variable-speed gear mechanisms using a pinion with radial pins and a cooperating face gear are well known. The rotational axes of the pinion and the face gear are maintained perpendicular and intersecting. An operative face of the gear is structured to mesh with the pins of the pinion at predetermined meshing radii, and the pinion is displaced between the meshing radii to obtain different gear ratios. The pins may be spring-biased to avoid jamming during such displacement.

The operative face of the gear has typically been formed with two types of meshing structures that define pin-seating positions. One type involves ribs effectively raised in the operative face of the gear; the other, distinct sockets recessed into the operative face. In a ribbed arrangement, the operative face may be divided into distinct sectors containing one or more sets of parallel ribs. The ribs define grooves that receive the pins of the pinion and are consequently spaced, at least at a meshing radii, according to the arc distance between adjacent pins. Examples of such ribbed arrangements are to be found in French patent No. 405,622 to Dondin, U.S. Pat. Nos. 3,075,397 to Winter, and 5,065,638 to the present inventor. In a socketted arrangement, concentric rings of sockets may be formed in the operative face of the groove. The sockets in each ring are equidistant from the rotation axis of the face gear and equally spaced according to the arc distance between the pins. An exemplary socketed arrangement is described in U.S. Pat. No. 684,215 to Foster.

A significant shortcoming in prior gear mechanisms of this type is that the pins tend to bind at small meshing radii. This is apt to occur during transition of the pinion to and from a small meshing radius or during attempts to operate the gear mechanism with the pinion initially meshed at a small radius. One object of the present specification is to provide a gear mechanism with a meshing structure that avoid such problems. Other objects include the provision of a neutral and reverse states of operation and structuring of the face gear to enhance transitions between socketed meshing structures at different radii.

BRIEF SUMMARY OF THE INVENTION

In one aspect, the invention provides a gear mechanism which includes a pinion and a face gear that are supported for rotation about mutually perpendicular rotational axes. The pinion has radial coplanar pins that are equally spaced circumferentially by a predetermined arn distance. Each pin is yieldably urged from the pinion to achieve a predetermined fully-extended state. The face gear has an operative face structured to mesh with the pins at predetermined meshing radii with an innermost meshing structure at a radially innermost meshing radii and another meshing structure at a next larger meshing radii. The innermost meshing structure comprises a multiplicity of sockets that are equidistant from the gear's rotational axis and equally spaced circumferentially by an arc distance corresponding to that separating the pins. Each socket has a pair of circumferentially opposing wall portions, an axial opening facing axially outwardly from the operative face, and a lateral opening extending circumferentially between the wall portions and facing radially outwardly relative to the gear's rotational axis. The lateral opening is dimensioned to permit passage of any one of the pins in its fully-extended state laterally between the wall portions while the pinion is meshed with the meshing structure. The wall portions are spaced to prevent relative circumferential displacement of a received pin. Each socket is associated with a recessed surface portion in the operative face of the gear. Each recessed surface portion extends radially outwardly from an axial bottom of the lateral opening of the associated socket and in both circumferential directions relative to the lateral opening. The recessed surface portion will generally span a sector of the gear which is considerably greater than the sector spanned by the wall portions, typically at least two fold greater.

When the pinion is meshed with the innermost meshing structure, each pin follows a complex path (as viewed in the plane of the face gear), moving both circumferentially and radially to very significant degrees relative to a receiving socket. Such complex movement occurs both during entry into and departure from the socket. The recessed surface portion associated with each socket accommodates such pin movement, permitting unobstructed displacement of a pin to and from the lateral opening of the socket. This avoids binding of pins and jamming during meshed operation at the innermost radius.

The recessed surface portions may be formed as separate and distinct recesses or cavities. In such circumstances, each may have a generally triangular shape with an apex at the socket and may span a surface area several fold larger than the internal cross-section of the associated socket. Each may also curve axially outwardly proximate to its radially outer periphery to facilitate displacement of the pinion between the innermost meshing structure and the meshing structure at the next meshing radius. The curvature causes a pin then seated within a socket to deflect radially into the pinion to facilitate the transition. The recessed surface portions may alternatively be defined, at least in part, by a single circumferential groove centered on the rotational axis of the gear. The groove may optionally have an axial depth, at least at some predetermined radius from the gear's rotational axis, sufficient that the pins do not contact the face gear when the pinion is located at the groove. This permits the gear mechanism to be placed in a neutral state with no power transmission between pinion and face gear. It also permits implementation of a "reverse gear" state. For example, two substantially identical pinions may be coaxially mounted on a common shaft, one to either side of the rotational axis of the gear. Either pinion may be displaced along the shaft to the groove and the other may then be actively meshed with the face gear at a desired meshing radius. This permits the direction of rotation of the face gear to be reversed without changing the absolute direction of rotation of the shaft where, for example, torque is applied to the gear mechanism through the shaft.

When the pinion is displaced from the innermost meshing radius to the next larger meshing radius, the pinion often slips relative to the operative face of the gear for a significant time before the pinion meshes with the face gear. The gear mechanism may be configured to reduce such slippage and speed meshing at the next larger meshing radius. To that end, each socket of the innermost meshing structure is radially aligned with a different pin-seating position defined by the meshing structure at the next larger meshing radius. Each socket is associated with a radial groove formed in the operative face of the gear. The radial groove intersects the recessed surface portion associated with the socket and also the pin-seating position radially aligned with the socket. Each such groove is shaped and dimensioned to guide movement of a pin radially in response to displacement of the pinion from the innermost meshing radius to the next larger meshing radius. If the pin is seated within a socket when such pinion displacement occurs, the radial groove associated with the socket receives the pin from the recessed surface portion associated with the socket and guides the pin into the pin-seating position radially aligned with the socket. A radially inner groove segment may be enlarged circumferentially to facilitate initial capturing of the pin and a radially outer portion may be comparatively narrower to guide the pin into the associated pin-seating position of the other meshing structure.

Various aspects of the invention have been briefly summarized above and others will be apparent from the description below of preferred embodiments of the invention. Those features which are regarded as inventive will be more specifically defined in the appended claims.

BRIEF DESCRIPTION OF THE DRAWINGS

The invention will be better understood with reference to drawings in which:

FIG. 6 is a fragmented plan view showing a second face gear which incorporates a neutral groove;

FIG. 7 is a view along the lines 7—7 of FIG. 6 further detailing meshing structure of the second face gear; and, FIG. 8 is a diagrammatic elevational view of another gear mechanism which incorporates the second face gear and two pinions to allow the direction of rotation of the face gear to be reversed.

DESCRIPTION OF PREFERRED EMBODIMENTS

Figure 1:
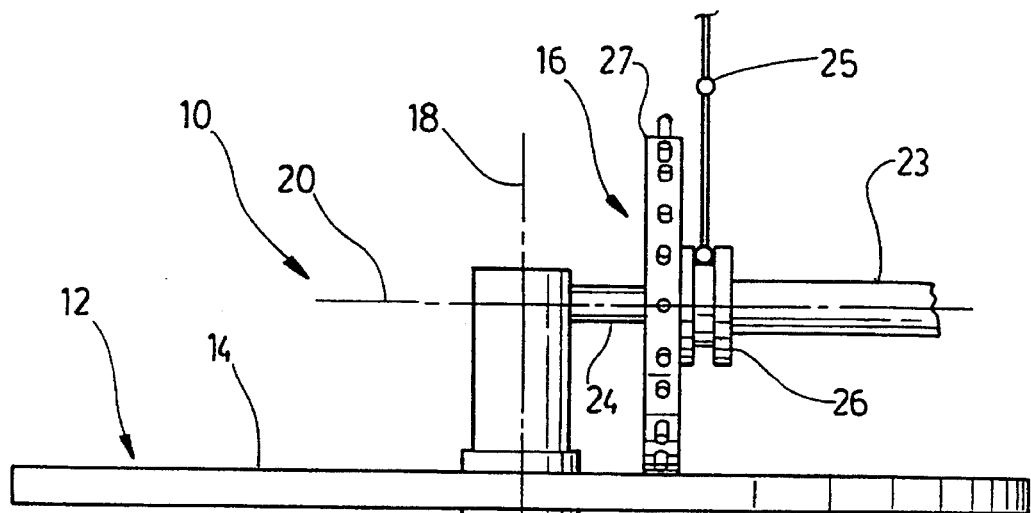
FIG. 1 is a diagrammatic elevational view, fragmented, showing a gear mechanism, including a pinion gear meshed with a face gear.
Figure 2:
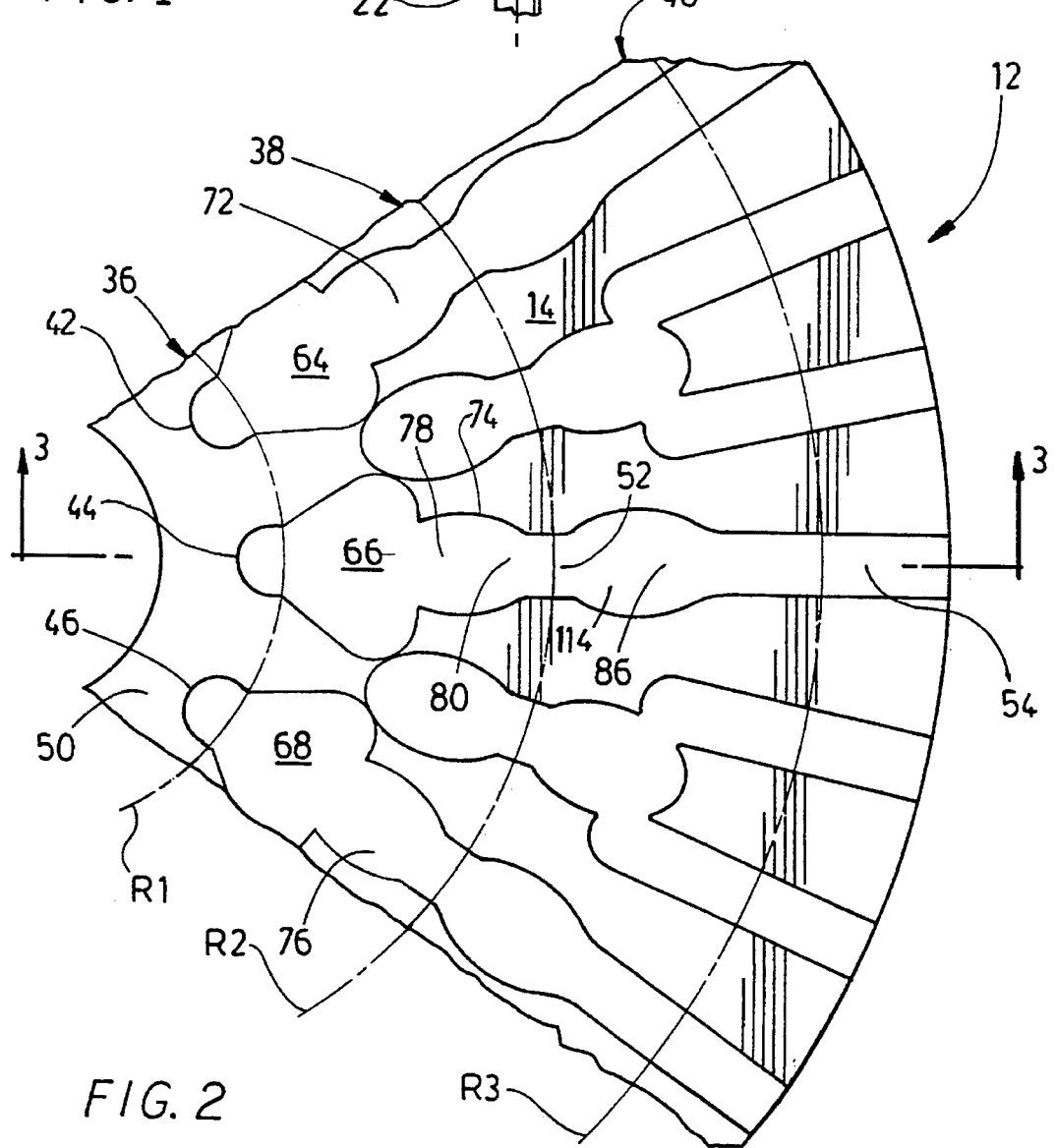
FIG. 2 is a fragmented plan view of the operative face of the gear.

Reference is made to FIG. 1 and 2 which illustrates a variable-speed gear mechanism 10 which includes a face gear 12 and a pinion 16. The face gear 12 and the pinion 16 rotate about mutually perpendicular and intersecting axes 18, 20. The operative face 14 of the gear 12 has three distinct radii R1, R2, R3 (measured from its rotational axis 18) at which it meshes properly with the pinion 16. The pinion 16 may be displaced axially along its rotational axis 20 (radially relative to the rotational axis 18 of the face gear 12) between the meshing radii R1, R2, R3.

The mounting means supporting the face gear 12 and the pinion 16 are conventional and have not been shown in detail. These include a vertical shaft 22 to which the face gear 12 is rigidly fixed. The pinion 16 is fixed to a sleeve 23 which rotates with, but displaces axially along, a horizontal supporting shaft 24. The pinion 16 and sleeve 23 may be displaced axially by operation of a lever mechanism 25 coupled to the sleeve 23 through a connector 26. Details regarding how the pinion 16 may be mounted relative to the face gear 12 are available in the prior patents referred to above, particularly U.S. Pat. No. 5,065,638, whose teachings are incorporated herein by reference. Torque may be applied to the horizontal shaft 24 supporting the pinion 16 through a pulley (not shown) fixed to the shaft 24. Alternatively, the shaft 22 supporting the face gear 12 may be rotated through an appropriate coupling element and the pinion 16 may be driven by the face gear 12.

The pinion 16 is conventional and will be described only briefly. It has a circular periphery 27 centered on the rotational axis 20 of the pinion 16 and having a nominal diameter of about 5 inches. It has ten identical pins which are radially oriented and in substantially coplanar relationship. Three exemplary pins 28, 30, 32 are identified in FIGS. 3–5. The pins are spring-biased so that they extend a common distance from the rotational axis 20 of the pinion 16. Details of appropriate biasing arrangements will be apparent from the prior art patents referred to above. In this particular embodiment, the pins protrude about ¼ inch through the periphery 27 and have a circular cross-section with a diameter of about xxx inches. The pins are equally spaced circumferentially by an arc distance of roughly ⅝ inches. For purposes of this specification, the term "arc distance" as applied to such radial pins may be measured center-to-center between tips of the pins along a hypothetical circle circumscribing the tips.

The face gear 12 comprises innermost, intermediate and outer meshing structures 36, 38, 40 centered about the rotational axis 18 of the gear 12 and each at a different meshing radius R1, R2 or R3. The meshing structures 36, 38, 40 comprise different pin-seating structures. The meshing structure 36 at the innermost radius R1 (about 1.3 inches) consists of 10 identical sockets (such as exemplary sockets 42, 44, 46 specifically indicated FIG. 2–5). The sockets are formed essentially as semi-circular recesses in the circumferential periphery of a generally circular central part 50 of the gear 12 which somewhat resembles a conventional sprocket. The next larger meshing radius R2 is nonfinally 2.6 inches and comprises a set of 20 pin-seating recesses (such as the recess 52 which is typical). The largest meshing radius R3 is nominally 3.9 inches and comprises a set of 30 similar grooves (such as the exemplary groove 54). The pin-seating structure in each of the meshing structures 36, 38, 40 are equally spaced substantially by the same arc distance separating adjacent pins. For purposes of this specification, the term "arc distance" between such axially oriented sockets may be measured between centers of the sockets along a hypothetical circle circumscribing such centers. If not already apparent, the face gear 12 is substantially radially symmetric, and only a section has been shown to facilitate illustration. Other face gears described herein have similar symmetry and have been similarly illustrated.

Figure 4:
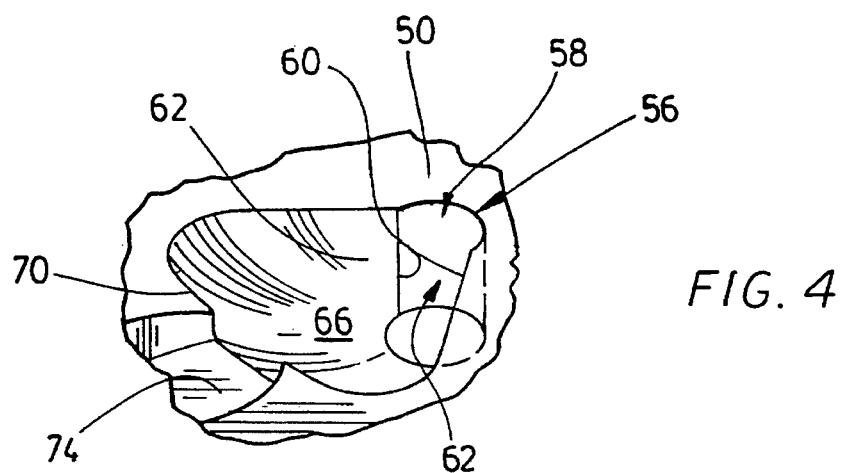
FIG. 4 is an enlarged, fragmented perspective view of a pin-seating socket at an innermost meshing radius of the face gear.
Figure 5:
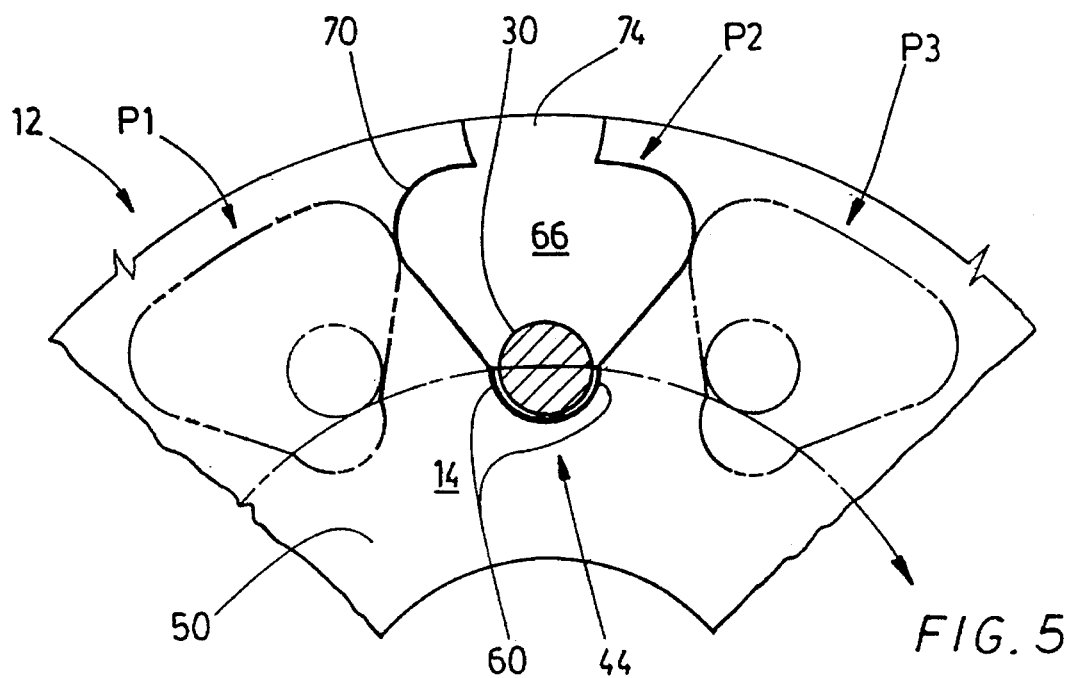
FIG. 5 is a fragmented diagrammatic plan view of the face gear showing how a pin of the pinion enters and exits from the pin-seating socket.

The characteristics of the sockets of the innermost ring 36 should be noted. The socket 44 is typical and will be described in detail. Although components of the socket 44 appear in several of the views, all reference numbers identifying the components can be found in FIGS. 4 and 5. In FIG. 5, the pin 30 and socket 44 are shown in three relative positions P1, P2 and P3 arising as the pinion 16 rotates the gear 12 clockwise (as viewed in the plane of FIG. 5). Components of the socket 44 are labeled only in the position P2 shown in solid outline.

The socket 44 has an inner part-cylindrical wall 56 that is substantially axially-oriented and has an axial opening 58 facing axially outwardly (upwardly in the orientation illustrated) from the operative gear face 14. A pin seats within the wall 56 in an axial orientation substantially as in the position P2 shown in solid outline in FIG. 5. The inner wall 56 defines a pair of circumferentially opposing wall portions 60 which are spaced circumferentially by a distance marginally larger than the diameter of the pin 30. This prevents relative circumferential displacement of the received pin 30 and forces the received pin 30 to drive the face gear 12 about its rotational axis 18. Pins are received in the socket 44 in a lateral direction or substantially radial to the axis of the socket 44 and the rotational axis 18 of the face gear 12. To that end, the socket 44 has a lateral opening 62 which extends circumferentially between the wall portions 60 and which faces radially outwardly. The opening 62 is dimensioned to pass the pin 30 laterally to and from the socket 44 with the pin in its extended state.

How pins enter and leave sockets at the innermost meshing radius R1 will be more apparent from FIG. 5. In the position P1 shown in phantom outline, the pin 32 is approaching the socket 46, the gear 12 then being driven clockwise by an adjacent pin (not illustrated). In the position P2, shown in solid outline, the pin 32 is fully seated within and driving the socket 46 clockwise. In position P3, the pin 30 has departed laterally from the socket 44. In FIG. 5, only successive positions of the pin 30 as projected onto plane of the operative face 14 is shown. It will be appreciated that motion of the pin 30 with rotation of the pinion 16 is more complex, involving lowering toward and rising from the operative face 14.

The sockets of the innermost meshing structure 36 are associated with substantially identical recessed surface portions formed in the operative face 14. Exemplary recessed surface portions are indicated with reference numerals 64, 66, 68 in FIG. 2. The recessed surface portion 66, which is typical, extends radially outwardly from the axial bottom of the pin-receiving opening 62 formed in the associated socket 44. It also extends in both circumferential directions relative to the pin-receiving opening 62, spanning a sector of the face gear 12 about xxx degrees, which is significantly larger than sector of yyy degrees spanned by the opposing wall portions 60 of the socket 44. The depth and circumferential span of the recessed surface portion 66 is sufficient that a pin has an unobstructed path into and out of the socket 44 while the pinion 16 is meshed at the innermost radius R1. The surface portion 66 also inclines axially outwardly in a continuous manner from the opening 62 to its radially outer periphery 70, as apparent in FIGS. 3 and 4. Thus, during transition of the pinion 16 from the innermost meshing radius R1 to the next radius R2, a pin then received in a socket 44 is deflected radially inwardly into the pinion 16. The continuous inclination axially outwardly with increasing radial distance from the gear's rotational axis 18 permits a smoother transition between the two meshing radii R1, R2.

The face gear 12 has radial grooves (such as the grooves 72, 74, 76 apparent in FIG. 2) in its operative face 14. The radial grooves facilitate meshing of the pinion 16 with the face gear 12 as the pinion 16 is displaced between adjacent meshing radii, specifically from the innermost meshing radius R1 to the next larger meshing radius R2. The general object is to encourage a pin of the pinion 16 to displace directly from a socket in the innermost meshing structure 36 to a recess of the intermediate meshing structure 38.

Each socket of the innermost socket ring 36 is associated with a different recess of the intermediate socket ring 38 and different one of the radial grooves. The relationship among the socket 44 of the innermost meshing structure 36, the associated pin-seating recess 52 of the intermediate meshing structure 38 and an associated groove 72 is typical. It will be noted that the socket 44 and pin-seating recess 52 are radially aligned relative to the rotational axis of the face gear 12. The radial groove 72 has a radially inner segment 78 that intersects the recessed surface portion 66 and a radially outer segment 80 that intersects the pin-seating recess 52. The radially inner segment 78 is expanded radially, having mouth at the recessed surface portion 66 whose circumferential extent is greater than that of the socket 38 and the pins. The radially inner segment 78 thus more readily captures a pin that is displacing radially outwardly with the radial displacement of the pinion 16, accommodating to a certain degree the relative rotation that may be occurring between the pinion 16 and the face gear 12. It then directs the pin's movement into the radially outer segment 80 which is narrower and converges toward the pin-seating recess 52.

Figure 3:
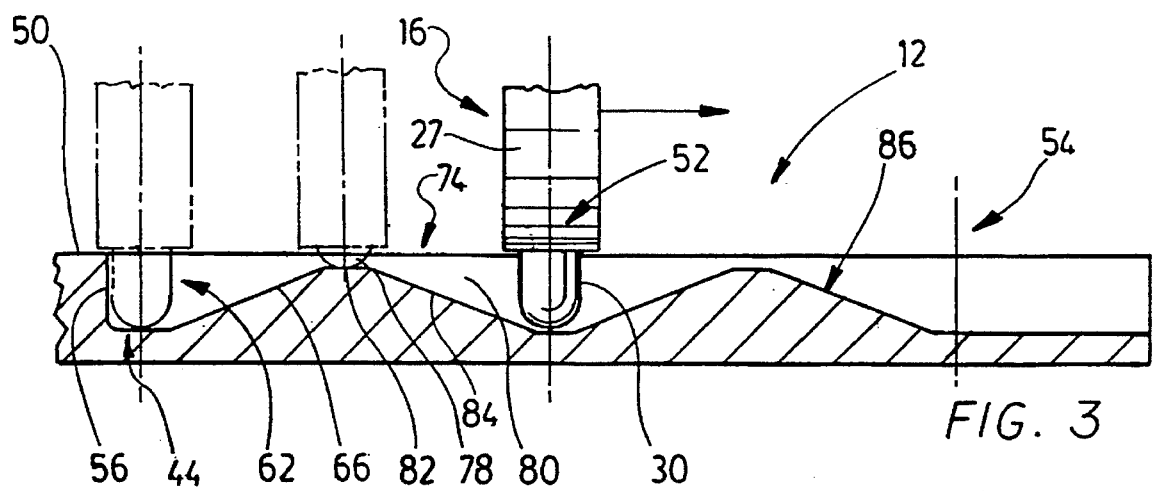
FIG. 3 is a view along the lines 3—3 of FIG. 2 further detailing meshing structures associated with the face gear.

How a pin is directed from the innermost socket ring 36 to next socket ring 38 will be more apparent from FIG. 3. In FIG. 3, the pin 30 is shown in three different position as the pinion 16 is displaced between the innermost and intermediate meshing radii R1, R2. The pinion 16 is assumed initially to be meshed with the innermost socket ring 36. The pin 30 is assumed to be seated in the radially inner socket 44, as indicated in phantom outline in FIG. 3. If the pinion 16 then displaces radially outwardly, the pin 30 is pressed radially into the pinion 16 by the recessed surface portion 66. The recessed surface portion has a radial cross-section (along a radial axis from the socket 38 to the pin-seating recess 52) which is straight and inclines axially outwardly with increasing radial distance from the gear's rotational axis. This discourages binding of the pin 30 within the pinion 16. The pin 30 is then received within the expanded groove segment 78, as shown in phantom in FIG. 3, and bears against the bottom surface 82 of the inner groove segment 78. The bottom surface 82 has a radial cross-section which is substantially straight and radial. With further displacement of the pinion 16, the pin 30 is guided by the radially outer groove segment 80 into the pin-seating recess 52 and the pinion 16 is immediately meshed with the intermediate meshing structure 38. The radially outer groove segment 80 has a bottom surface 84 with a radial cross-section that is straight and inclines axially downwardly with increasing radial distance from the gear's rotational axis. This reduces the tendency of the pin 36 to bind within the pinion 16 as it extends. The flat radial nature of the bottom surface 82 of the radially inner groove segment 78 avoids an abrupt transition of the pin between two inclined surfaces, once again reducing binding. It should be noted that the pin 30 would be similarly depressed into the pinion 16 and extended in response to the various bottom surfaces if the pinion 16 were displaced radially inwardly from the intermediate meshing structure 38 to the innermost meshing structure 36.

It should be understood that such displacement of a pin along the radial groove 72 between the meshing structures 36, 38 cannot be guaranteed with each transition of the pinion 16 between the relevant meshing radii R1, R2. Much depends on the actual angular orientation of the pinion 16 at the time the transition is made. However, operation is improved.

It will be noted that a similar pin guiding arrangement is implemented between each pin-seating recess of the intermediate meshing structure 38 and a different one of the pin-seating grooves of the outermost meshing structure 40. For example, the pin-seating recess 52 of the intermediate meshing structure 38 is radially aligned with the groove 54 of the outermost meshing structure 40. A radial groove 86 extends between these pin-seating structures 52, 54 and functions much like the groove 72. The groove has an expanded radially inner segment 114 and a radially outer segment with substantial parallel sidewalls. The bottom surfaces of the groove 86, as apparent from FIG. 3, provide for similar depression and extension of a pin.

The groove 86 serves an additional function. Its expanded radially inner segment 114 accommodates convoluted pin movement when the pinion 16 is meshed at the intermediate meshing radius R2. Pins follow much less convoluted paths relative to pin-seating positions at larger meshing radii, and accordingly the radially inner groove segment is comparatively small. Such measures are not required at the outermost meshing radius R3.

An alternative face gear 88 is shown in FIGS. 6–8 and can be used with the same pinion 16. Features common to the face gear 12 above have been indicated with common reference numerals, and may be understood with reference to the description above.

A continuous circular groove 90 is formed in the operative face 14 of the gear 88. The groove 90 is centered on the rotational axis 18 of the face gear 88 at a radial distance between the innermost and intermediate meshing radii R1, R2. It circumscribes the sockets of the innermost ring 36 and accesses the lateral opening associated with each socket. During meshed operation at the innermost meshing radius R1, the groove 90 performs the same functions as the separate and distinct recessed surface portions 64, 66, 68 associated with the face gear 12 previously described. It basically provides an unobstructed path for each pin into and out of the receiving sockets of the gear 88. The bottom surface 92 of the groove 90 curves axially outwardly proximate to the radial periphery 94 of the groove 90. The purpose of tapering its depth is once again to allow a smooth transition between the innermost and intermediate meshing radii R1, R2 by defining a surface which deflects a pin radially into the pinion 16 as it is forced radially outwardly from a socket.

The bottom of the groove 90 has a uniform depth just sufficient to clear the pins in their full extended states. This is apparent in FIG. 7 where the pin 30 of the pinion 16 has been shown fully extended and positioned within the groove 90. This arrangement provides a neutral function. By displacing the pinion 16 to the radius of the groove 90, the face gear 88 and pinion 16 rotate independently and no power transmission occurs.

A reversible gear mechanism 96 exploiting the presence of the neutral groove 90 in the face gear 88 is shown in FIG. 7. The pinion 16 described above and another substantially identical pinion 98 are fixed to a common shaft 100 for rotation together with the shaft 100. Each pinion 16 or 98 is located to a different side of the rotational axis 18 of the face gear 88 with their respective rotational axes (not illustrated) substantially coincident. Each can be displaced axially along the shaft 100, separate from the other, between the various meshing radii R1, R2, R3 and the neutral groove 90. The mounting means required to mount the pinions in such relationship to the shaft 100 may essentially duplicate the mounting of a single pinion, and an appropriate implementation will be readily apparent from the prior patents referred to herein. A pulley (not illustrated) or alternative coupling element may be secured to the shaft 100 to permit a torque to be applied to the shaft 100.

In operation, the pinion 16 might initially be meshed with the face gear 88 to rotate the face gear 88 in predetermined direction about its rotational axis 18 and the other pinion 98, located at the neutral groove 90. (Such initial positioning of the pinions 16, 98 is not illustrated.) The pinion 16 may then be displaced to the radius of the neutral groove 90, as shown in FIGS. 7 and 8, allowing the pinion 16 to freewheel relative to the face gear 88. The pinion 98 may then be displaced to the intermediate meshing radius R2, as shown in FIG. 7, effectively driving the face gear 88 in a reverse direction about its rotational axis 18.

It will be appreciated that particular embodiments of the invention have been described and that modifications may be made therein without departing from the spirit of the invention or necessarily departing from the scope of the appended claims.

I claim:

1. In a variable-speed gear mechanism including a pinion which comprises a rotational axis, a multiplicity of radial coplanar pins equally spaced circumferentially by a predetermined arc distance, and means yieldably urging each of the pins radially from the pinion to a predetermined fully-extended state; a face gear which comprises a rotational axis substantially perpendicular to and intersecting the rotational axis of the pinion and an operative face structured to mesh with the pins of the pinion gear at a plurality of predetermined meshing radii, the operative face of the gear comprising an innermost meshing structure at a radially innermost one of the plurality of meshing radii and another meshing structure at a next larger one of the meshing radii; and means which support the pinion and the gear for rotation about their respective rotational axes and permit selective displacement of the pinion between the meshing radii, the improvement in which:

the innermost meshing structure comprises a multiplicity of sockets equidistant from the rotational axis of the gear and equally spaced circumferentially by an arc distance corresponding to the predetermined arc distance between the pins of the pinion;

each of the sockets comprises a pair of circumferentially opposing wall portions that are substantially axially oriented, an axial opening facing axially outwardly from the operative face of the gear, and a lateral opening extending circumferentially between the wall portions, the lateral opening facing radially outwardly relative to the rotational axis of the gear and being dimensioned to permit passage of any one of the pins in its fully-extended state laterally between the wall portions when the pinion is meshed with the meshing structure, the pair of opposing wall portions being spaced to prevent relative circumferential displacement of the received pin; and, each of the sockets is associated with a recessed surface portion in the operative face of the gear, each of the recessed surface portions extending radially outwardly from an axial bottom of the lateral opening of the associated socket and extending in both circumferential directions relative to the lateral opening of the associated socket, each of the recessed surface portions spanning a sector of the gear which is greater than the sector spanned by the opposing wall portions of the associated socket and permitting unobstructed displacement of any of the pins to and from the lateral opening of the associated socket as the pinion rotates in meshed relationship with the innermost meshing structure.

2. The gear mechanism of claim 1 in which the innermost meshing structure is a central portion of the gear, the central portion having a periphery shaped to define a multiplicity of axially-oriented, part-cylindrical recesses, each of the recesses constituting a different one of the sockets.

3. The gear mechanism of claim 1 in which the recessed surface portion associated with each of the sockets curves axially outwardly at least proximate to a radially outer periphery of the recessed surface portion thereby to deflect a pin of the pinion which is then seated in the socket associated with the recess surface portion radially inwardly into the pinion as the pinion is displaced radially relative to the rotational axis of the gear from the innermost meshing radius to the other meshing radii.

4. The gear mechanism of claim 1 in which a substantially circular groove centered on the rotational axis of the gear is formed in the operative face of the gear at a radius larger than the innermost meshing radius, the groove having sufficient axial depth that the pins of the pinion in their fully-extended states do not contact the face gear while the pinion is located at the groove thereby providing a neutral state in which the pinion free wheels relative to the face gear.

5. The gear mechanism of claim 4 in which the groove defines at least in part each of the recessed surface portions.

6. The gear mechanism of claim 4 in which the pinion is a first pinion and in which:

the gear mechanism includes a second pinion comprising a rotational axis, a multiplicity of radial coplanar pins equally spaced circumferentially by the predetermined arc distance, and means yieldably urging each of the pins of the second pinion radially from the pinion to a predetermined fully-extended state; and, the mounting means comprises a shaft on which the first and second pinions are mounted for rotation with the shaft, each of the first and second pinions being located on a different side of the rotational axis of the gear, and comprises means permitting either of the first and second pinions to be displaced along the shaft to the groove and the other of the first and second pinions to be displaced to one of the meshing radii of the face gear.

7. The gear mechanism of claim 1 in which:

the other meshing structure defines a multiplicity of pin-seating positions located at the next larger one of the meshing radii and equally spaced circumferentially by an arc distance corresponding to the predetermined arc distance between the pins of the pinion;

the face gear comprises a multiplicity of radial grooves in its operative face, each of the radial grooves is shaped and dimensioned to constrain movement of a pin of the pinion that locates within the radial groove radially in response to displacement of the pinion from innermost meshing radius to the next larger one of the meshing radii; and, each of the sockets of the innermost meshing structure is associated with a different one of the radial grooves and a different one of the pin-seating positions of the other meshing structure, each of the sockets is radially aligned with the associated pin-seating position and the associated radial groove intersects the recessed surface portion and pin-seating position associated with the socket.

8. The gear mechanism of claim 7 in which, for each of the sockets of the innermost meshing radius:

the associated radial groove comprises a radially inner segment which intersects the recess associated with the socket and a radially outer groove segment which intersects the associated pin-seating position; and, the radially inner segment is circumferentially wider than the radially outer segment.

9. The gear mechanism of claim 7 in which, for each of the sockets of the innermost meshing radius:

the associated recessed surface portion has a radial cross-section which is substantially straight and which inclines axially outwardly with increasing radial distance from the rotational axis;

the associated radial groove comprises a radially inner bottom surface portion which meets the recessed surface portion associated with the socket and a radially outer bottom surface portion that extends between the radially inner bottom surface portion and the pin-seating position associated with the socket, the radially inner bottom surface portion has a radial cross-section which is substantially straight and radially oriented, and the radially outer bottom surface portion has a radial cross-section which is substantially straight and which inclines axially inwardly with increasing radial distance from the rotational axis.

10. In a variable-speed gear mechanism including a pinion comprising a rotational axis, a multiplicity of substantially identical radial coplanar pins equally spaced circumferentially by a predetermined arc distance, and biasing means yieldably urging each of the pins to extend radially from the pinion such that each of the pins in its extended state is a common distance from the rotational axis of the pinion; a face gear comprising a rotational axis substantially perpendicular to and intersecting the rotational axis of the pinion and comprising an operative face structured to mesh with the pins of the pinion gear at a plurality of predetermined meshing radii relative to the rotational axis of the gear; and means supporting the pinion and the gear for rotation about their respective rotational axes and permitting selective displacement of the pinion axially relative to its rotational axis between the predetermined meshing radii, the improvement in which the operative face of the gear comprises a circumferential groove centered on the rotational axis of the face gear, the groove having a depth which is sufficiently great that the pins of the pinion are clear of face gear when the pinion is positioned substantially at the groove thereby providing a neutral state in which the pinion free wheels relative to the face gear.

11. The mechanism of claim 10 in which:

the operative face of the gear comprises a meshing structure at an innermost of the plurality of predetermined meshing radii which comprises:

a multiplicity of sockets equidistant from the rotational axis of the gear and equally spaced circumferentially by an arc distance corresponding to the predetermined arc distance between the pins of the pinion;

each of the sockets comprising a pair of circumferentially opposing wall portions which are substantially axially oriented, an axial opening facing axially outwardly from the operative face, and an opening which is axially oriented and extends circumferentially between the wall portions, the opening facing radially outwardly relative to the rotational axis of the gear and being dimensioned to pass any one of the pins laterally between the wall portions, the pair of opposing wall portions being spaced to prevent relative circumferential displacement of the received pin;

each of the sockets being associated with a generally recessed surface portion formed in the operative face of the gear, the surface portion extending radially outwardly from an axial bottom of the opening of the associated socket and extending in both circumferential directions relative to the opening of the associated socket, the surface portion spanning a sector of the gear which is significantly greater than the sector spanned by the opposing wall portions of the associated socket and having sufficient depth to permit unobstructed displacement of a pin to and from the open wall of a socket while the pinion is meshed with the face gear at the innermost radius.

12. The mechanism of claim 10 in which:

the operative face of the gear comprises a meshing structure at an innermost of the plurality of predetermined meshing radii which comprises:

a multiplicity of sockets equidistant from the rotational axis of the gear and equally spaced circumferentially by an arc distance corresponding to the predetermined arc distance between the pins of the pinion;

each of the sockets comprising a pair of circumferentially opposing wall portions which are substantially axially oriented, an axial opening facing axially outwardly from the operative face, and an opening which is axially oriented and extends circumferentially between the wall portions, the opening facing radially outwardly relative to the rotational axis of the gear and being dimensioned to pass any one of the pins laterally between the wall portions, the pair of opposing wall portions being spaced to prevent relative circumferential displacement of the received pin; and, the groove circumscribes the multiplicity of sockets and accesses the opening of each of the sockets thereby to permit unobstructed displacement of a pin to and from the opening of each of the sockets while the pinion is meshed with the face gear at the innermost radius.

13. The mechanism of claim 10 in which the pinion is a first pinion of the mechanism and in which the mechanism further comprises:

a second pinion comprising a predetermined rotational axis, a circular periphery centered on the rotational axis of the second pinion, a multiplicity of substantially identical pins radially oriented relative to the rotational axis of the second pinion and in substantially coplanar relationship, and biasing means yieldably urging the pins of the second pinion outwardly through the periphery of the second pinion such that each of the pins of the second pinion extends substantially a common distance from the periphery of the second pinion, the pins of the second pinion being equally spaced circumferentially by the predetermined arc distance between the pins of the first pinion; and, the mounting means comprising a shaft on which the first and second pinions are mounted for rotation with the shaft each to a different side of the rotational axis of the gear, and comprising me,ms permitting either one of the first and second pinions to be displaced along the shaft to the groove and the other of the first and second pinions to one of the meshing radii of the face gear.

* * * * *